United States Patent Office 2,770,255
Patented Nov. 13, 1956

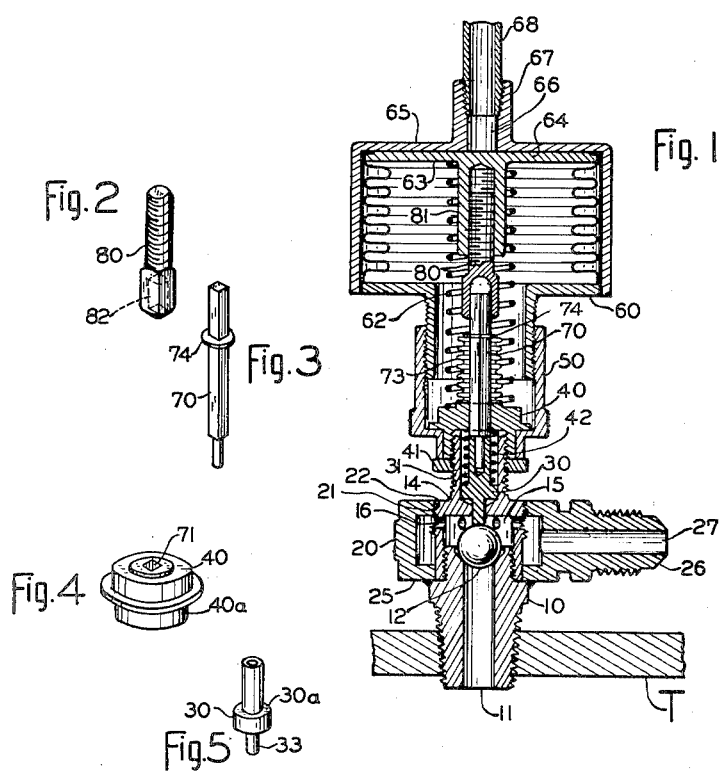

2,770,255

DUAL-RANGE SAFETY VALVE

Robert H. Goddard, deceased, late of Annapolis, Md., by Esther C. Goddard, executrix, Worcester, Mass., assignor of one-half to The Daniel and Florence Guggenheim Foundation, New York, N. Y., a corporation of New York Application August 16, 1952, Serial No. 304,787

1 Claim. (Cl. 137—529)

This invention relates to a safety valve selectively responsive to high and low pressures. Under certain operating conditions, a safety valve is desired which is responsive to a relatively high operating pressure, such as 700 pounds per square inch, and under other operating conditions the valve is desirably responsive to a relatively low pressure, such as 35 pounds per square inch.

It is the general object of this invention to provide a dual-range safety valve which is selectively and conveniently operative either at a predetermined high range or at a predetermined low range.

Provision is also made for independent adjustment of either the predetermined high pressure or the predetermined low pressure as desired and without changing the relative cooperation of the parts.

The invention further relates to arrangements and combinations of parts which will be hereinafter described and more particularly pointed out in the appended claim.

A preferred form of the invention is shown in the drawing, in which

Fig. 1 is a sectional front elevation of the improved safety valve; and

Figs. 2 to 5 are perspective views of separate detail parts to be described.

Referring to the drawing, the improved safety valve comprises a valve casing 10 threaded for insertion in a corresponding opening in a tank or other container T. The casing 10 has an axial opening 11 normally closed at its upper end by a ball 12.

A sleeve-like member 14 is threaded onto the upper end of the casing 10 and encloses a recess 15 having a plurality of ports 16 in its outer side wall. An outer casing 20 has its upper portion threaded at 21 to engage a correspondingly threaded portion 22 of the member 14.

The lower surface 25 of the outer casing 20 is firmly seated against a shoulder on the casing 10, and the casing 20 is provided with a lateral projection 26 having a discharge opening 27 therethrough.

Any liquid released through the safety valve passes through the ports 16 into the space enclosed by the outer casing 20, and is thence discharged through the opening 27.

A valve-closing member 30 (Fig. 5) is slidable in an upward sleeve-like extension 31 of the member 14 and has a reduced downward extension 33 extending loosely through an axial opening in the member 14.

A bearing member 40 (Fig. 4) is threaded to the upward extension 31 of the member 14 and may be secured in adjusted position by a lock nut 41. A light coil spring 42 is interposed between an upwardly-facing surface 30a on the closing member 30 and a downwardly-facing surface on the bearing member 40.

As thus far described, the safety valve is adapted to low-pressure operation and will open whenever the pressure in the opening 11 exceeds the downward force of the spring 42 on the closing member 30.

An upwardly extending outer sleeve 50 has a close sliding fit on the lower end 40a of the bearing member 40 and is held in position by the lock nut 41 previously described.

An upper casing member 60 is firmly threaded in the upper end of the sleeve 50 and encloses a relatively heavy spring 62 which is mounted between an upper surface on the member 40 and the lower surface 63 of a plate or disc 64 loosely mounted in the casing 60 and normally engaging the upper end portion 65 thereof. A port 66 in an axial boss 67 on the plate 65 may be connected by a tube 68 to a supply of high-pressure fluid.

A preferably-rectangular rod 70 (Fig. 3) is slidable in a corresponding rectangular opening 71 (Fig. 4) in the member 40 previously described, and its reduced lower end is centered in the closing member 30.

A bellows sleeve 73 loosely surrounds the rod 70 and is secured at its upper end to a flange 74 on the rod, and at its lower end engages an upper surface of the bearing member 40. The bellows sleeve 73 prevents undesired upward escape of liquid when the safety valve is opened.

A stud 80 (Fig. 2) is threaded in a boss 81 extending downward axially from the plate or disc 64, and the stud 80 has a rectangular recess 82 (Fig. 2) to receive the upper end of the rod 70.

The compression of the relatively strong upper spring 62 may be adjusted by screwing the upper casing member 60 into or out of the sleeve 50, and as the stud 80 is of the same pitch as the threaded connection between the parts 50 and 60, the clearance between the stud 80 and the upper end of the rod 70 will remain unchanged, even when the adjustment of the spring 62 is changed.

The relatively-light low-pressure spring 42 may be similarly adjusted by loosening the lock nut 41 and screwing the superposed structure upward or downward on the threaded extension 31 of the member 14, and this may be accomplished without changing the clearance between the rod 70 and the stud 80.

The operation of the described structure will now be set forth. For low-pressure operation, the pressure in the supply pipe 68 is relieved, allowing the spring 62 to raise the plate 64 and associated parts so that clearance is provided between the stud 80 and the upper end of the rod 70.

The safety valve will then respond to any rise in pressure which lifts the ball 12 against the light spring 42.

When it is desired to use the same safety valve in a high-pressure range, a selected pressure is applied through the tube 68 to the upper casing 60, thus compressing the spring 62 and depressing the disc 64 and stud 80 to act through the closing member 30 to seat the ball 12 until the pressure on the ball is sufficient to overcome the relatively heavy total net pressure on the plate 64, after which the safety valve will be responsive in its predetermined high-pressure range.

Thus the dual safety valve is effective to control either low pressure or high pressure in the tank T, accordingly as control pressure is applied or released in the control pipe 68. A dual range safety valve of relatively simple construction is thus provided, and means is also provided for varying either the high or the low control pressure without changing the clearance of the valve control parts.

Having thus described the invention and the advantages thereof, it will be understood that the invention is not to be limited to the details herein disclosed, otherwise than as set forth in the claim, but what is claimed is:

A dual range safety valve comprising a relief valve, a valve-closing member, a light spring to apply relatively light closing pressure to said member, additional fluid pressure-operated means to apply a relatively much higher closing pressure to said member, a heavier spring urging said additional means to inoperative position, predetermined clearance being provided between said additional means and said closing member, and means for adjusting the heavier spring pressure while maintaining the predetermined clearance unchanged, and which latter means comprises screw-threaded pressure-adjusting means for said heavier spring and screw-threaded clearance adjusting means for said valve-closing member, and said two screw-threaded means being mechanically interconnected and of the same hand and pitch whereby they rotate simultaneously and equally when said heavier spring is adjusted.

References Cited in the file of this patent

UNITED STATES PATENTS

| | | |
|---|---|---|
| 1,367,452 | Bolton | Feb. 1, 1921 |
| 1,753,024 | Rode | Apr. 1, 1930 |
| 1,836,416 | Weber | Dec. 15, 1931 |
| 2,079,135 | Turner | May 4, 1937 |
| 2,398,811 | Stacy | Apr. 23, 1946 |
| 2,602,467 | Griswold | July 8, 1952 |